United States Patent [19]
Dias et al.

[11] Patent Number: 5,474,587
[45] Date of Patent: Dec. 12, 1995

[54] POROUS FLUID-PERMEABLE MOLDINGS OF SILICON CARBIDE AND PROCESS OF PRODUCTION

[75] Inventors: Francisco J. Dias, Jülich; Freimut J. Koch, Erkelenz, both of Germany

[73] Assignee: Forschungszentrum Julich GmbH, Julich, Germany

[21] Appl. No.: 211,007

[22] PCT Filed: Sep. 5, 1992

[86] PCT No.: PCT/DE92/00753

§ 371 Date: Mar. 11, 1994

§ 102(e) Date: Mar. 11, 1994

[87] PCT Pub. No.: WO93/06059

PCT Pub. Date: Apr. 1, 1993

[30] Foreign Application Priority Data

Sep. 14, 1991 [DE] Germany .......................... 41 30 630.9

[51] Int. Cl.⁶ ........................... B01D 39/20; C01B 31/36
[52] U.S. Cl. ........................ 55/523; 55/301; 55/DIG. 5; 55/DIG. 30; 60/311; 96/146; 96/153; 264/29.5; 264/60; 264/DIG. 48
[58] Field of Search ................... 55/523, 282, 301, 55/527, DIG. 5, DIG. 30; 96/146, 153, 154; 95/278, 283, 114, 115, 148; 60/303, 311; 264/29.5, 63, 60, 65, DIG. 48

[56] References Cited

U.S. PATENT DOCUMENTS

| | | | |
|---|---|---|---|
| 4,532,091 | 7/1985 | Dias et al. | 264/29.5 |
| 4,791,785 | 12/1988 | Hudson et al. | 55/DIG. 30 |
| 5,016,437 | 5/1991 | Huether et al. | 60/303 X |
| 5,073,178 | 12/1991 | Mimori et al. | 55/523 |
| 5,080,953 | 1/1992 | Horikawa et al. | 55/523 X |
| 5,087,272 | 2/1992 | Nixdorf | 55/DIG. 30 |
| 5,177,035 | 1/1993 | Gee et al. | 55/523 X |
| 5,258,164 | 11/1993 | Bloom et al. | 55/527 X |

FOREIGN PATENT DOCUMENTS

| | | |
|---|---|---|
| 58-122016 | 7/1983 | Japan . |
| 784027 | 6/1978 | U.S.S.R. . |

*Primary Examiner*—Richard L. Chiesa
*Attorney, Agent, or Firm*—Herbert Dubno

[57] ABSTRACT

A process for producing a porous fluid permeable body which is heatable by the passage of electric current therethrough. The process involves coating silicon-containing particles with a cokable organic binder to produce coated particles with a particle size fraction of 0.2 to 10 mm, forming the particles into a molding, coking the binder and heating the molding at 1400° to 2000° C. in the presence of nitrogen to form a doped body containing 30% to 100% β-silicon carbide.

7 Claims, 1 Drawing Sheet

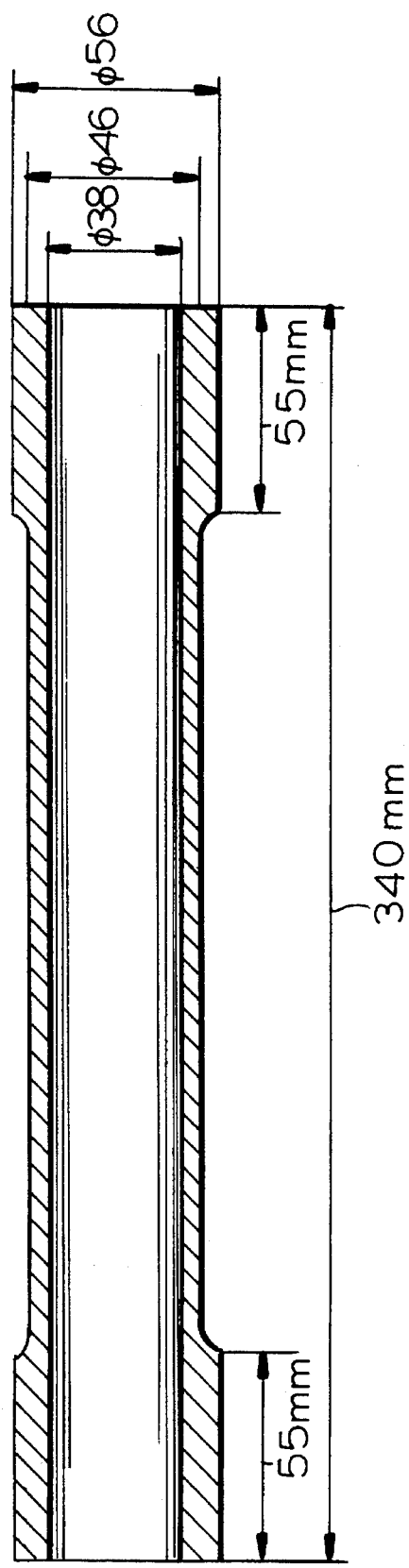

POROUS FLUID-PERMEABLE MOLDINGS OF SILICON CARBIDE AND PROCESS OF PRODUCTION

CROSS REFERENCE TO RELATED APPLICATION

This application is a national phase of PCT/DE 92/00753 filed 5 Sep. 1992 and based, in turn, upon German national application P 41 30 630.9 of 14 Sep. 1991 under the International Convention.

FIELD OF THE INVENTION

The present invention relates to a process for producing porous, fluid-permeable moldings of silicon carbide and to a diesel-soot filtering element as made by the process.

BACKGROUND OF THE INVENTION

Ceramic filtering media of ceramic carbide and a process for making same are known, for example, from the German Patent 33 05 529. Such filter bodies can, because of their chemical stability and their to high temperatures and to temperature resistance fluctuation be used as hot gas filters, through-flow electrodes or catalyst carriers.

For these and also for other applications it is, however, advantageous for such fluid-permeable silicon carbide bodies to be electrically heatable with low voltages, especially voltages below 50 volts, so that they can serve both as filters and simultaneously as heating elements.

For this purpose, a silicon carbide body has been provided, for example, in German Patent 33 05 529 with a high electrical resistance of 20 k$\Omega$cm for use as a heating element. It is indeed also known that the electrical conductivity of silicon carbide can be varied over a wide range by suitable doping with aluminum, boron, nitrogen, etc.

Thus silicon carbide structural elements are doped with nitrogen by annealing them in a nitrogen atmosphere at 1900° C. for several hours. This is, however, an especially slow process and, in any event, the electrical resistance of such doped silicon carbide bodies is always too high for the use of such bodies as heating elements in the low voltage range.

OBJECTS OF THE INVENTION

It is, therefore, the object of the invention to provide a process of the aforedescribed type for making porous fluid-permeable moldings of silicon carbide, which because of a reduced electrical resistance are electrically heatable and thus can also be used as heating elements.

SUMMARY OF THE INVENTION

The object set forth for the invention is attained in with the invention, in that the molding is subjected after a coking process to tempering at 1400° C. to 2000° C. and the resulting siliconizing step is carried out with formation of the β silicon carbide simultaneously with doping with nitrogen. The crux of the invention thus is that the doping is not effected on the finished siliconized body but on coked material during the siliconizing step. As a result, the final body has an electrical resistance imparted thereto which is drastically reduced in spite of the high porosity and the doping is effected in a shorter time than when the doping process is carried out on the finished siliconized body.

The doping which is effected simultaneously with the siliconizing can be carried out by providing the nitrogen in the form of an appropriate compound, for example, as silicon nitrite, which is added to the powder mixture or by impregnating the coked material with a nitrogen containing substance as, for example, aluminum nitrite. Both inventive modes of the process have the effect that during the tempering of the moldings to 1400° C. to 2000° C., nitrogen liberated at these temperatures from the nitrogen-containing compound effects a doping; an optionally doping is also effected with aluminum. A further possibility of doping with simultaneous siliconizing resides in the heating of the moldings to a temperature of 1400° to 2000° C. under a nitrogen or nitrogen-containing atmosphere.

To achieve a uniform electrical heatability of the molding, it should be intrinsically homogeneous. For this purpose, the powder mixture is initially slurried in a liquid in which the binder is partly or fully soluble and which also contains the further components and which is introduced into another liquid with which the solvent is miscible and in which the binder however is insoluble or only slightly soluble, to precipitate grains from the slurry coated with the binder to form a mass which is freed from the supernatant liquid by decanting and is then dried. The binder can be, for example, pitch, tar or synthetic resin; the carbon optionally provided in the mixed powder can be composed of ground coke, electrographite, natural graphite, wood charcoal or other cellulosic charcoal and/or carbon black.

It is also advantageous to effect the slurrying in a mixing chamber by means of mixing nozzles injecting the slurry into the precipitating liquid so that the grains are uniformly coated with the binder. A further advantage of this mode of the process is that the components are homogeneously fixed by agglomeration. It is also advantageous for the proportion of the binder in the suspension to be more than 10% by weight of the dry solids Since the β silicon carbide proportion of the material positively influences the electrical resistance of the body, this proportion of the components of the mixed powder should be so dimensioned that the proportion of the β silicon carbide formed from the silicon and carbon after heating of the molding to a temperature of 1400° to 2000° C. amounts to 30 to 100% of the body. The specific electrical resistance is lower as the proportion of β silicon carbide in the final body is higher.

The result is silicon carbide bodies which can be used not only as filters but simultaneously also as heating elements for gases and liquids and thus can be utilized in chemical processes technology.

Thus substrates which chemically react with one another only at high temperatures can be converted in traversing the filter body in that the body is simultaneously heated electrically to the desired temperature. Simultaneously, catalysts which are necessary for many chemical reactions can also easily be incorporated in the material of the body.

A further field of the application is the use of electrically heatable silicon carbide bodies as diesel soot filters. For this purpose, it is advantageous that a tubular body be formed as the green body from a powder mixture or granulate with a particle size range containing a fraction of 0.2 to 2 mm. Such diesel soot filters fabricated in accordance with the invention have, because of their uniform pore distribution in the body, a filter efficiency for soot in excess of 98%.

The electrically heated silicon carbide body serving as a diesel soot filter and produced in accordance with the process of the invention, has the advantage that the soot retained in the filter body can be burned off by the heating of the body itself. As a consequence however, the body can be simultaneously and uniformly regenerated with the combustion of the retained soot particles by the electrical heating. This type of regeneration is particularly gentle and controllable. By contrast, the ceramic filter systems used in current diesel driven motors must be periodically heated by additional burner devices for throughflow regeneration. That means that additional space is required for locating the burner and uncontrollable combustion heating can arise during the regeneration of the filter system, leading to local overheating and damage to the filter body.

A diesel soot filter element is preferably comprised of a fluid-permeable body of silicon carbide with a porosity of 35 to 75% and a specific electric resistance of $10^{-2}$ to $<18\Omega$ $cm^{-1}$, optionally also a specific resistance below 10 or 15$\Omega$ $cm^{-1}$, which can be electrically heatable and regeneratable via the supply of electricity.

It is also advantageous to form the body with a tubular configuration, whereby the body in cross section, can be round, oval, square, honeycomb shaped or the like.

Depending upon the field of application, such diesel soot filter elements can have an internal diameter of 5 to 100 mm, a wall thickness of 0.5 to 30 m and a length of 50 mm to 3 mm. In addition, the wall of the body at both ends, in the region of the electrical contacts applied for electrical heating, can be thickened so that at these locations a high conductivity is afforded, whereby simultaneously an excessive heating of the body in the region of the applied electrical contacts is precluded.

BRIEF DESCRIPTION OF THE DRAWING

The above and other objects, features, and advantages will become more readily apparent from the following description, reference being made to the sole Figure of which is a cross sectional view through a porous fluid permeable body fabricated in accordance with the invention and constituting a diesel soot filter.

SPECIFIC DESCRIPTION AND EXAMPLES

The following examples indicate possibilities for the manufacture of porous, fluid-permeable moldings of silicon carbide in the method according to the invention. Examples 1 and 2 as well as 3 and 4 give in addition the specific electrical resistances of the resulting filter bodies both after doping of finished siliconized bodies and after doping in accordance with the process of the invention.

EXAMPLE 1

275 g Novolak resin is dissolved in one 1 Ethanol and formed into a slurry upon addition of 289 g $\alpha$-SiC, 34 g electrographite and 402 g Si (particle diameter of the filler materials used being between 0.5 µm and 50 µm). The suspension claims 2 to 4 and atomized into water, the water in soluble binder resin precipitating upon the filler particles. By filtration, the thus coated powder is separated from the liquid and is agglomerated in a tumbling mixer and dried.

The fraction of the agglomerate with a particle size of 0.5 to 1.0 mm is separated by sieving and is pressed at 120° C. quasi-isostatically with a press pressure of 300 hPa to a tubular body with a length of 406 mm, and an internal diameter of 36 mm and an outer diameter of 60 mm.

This green preform is coked by heating under an argon atmosphere to 850° C. with a weight loss and dimensional change indicating that the binder resin phase of the tube has transformed to carbon. The length of the resulting tubular body amounted to 383 mm, the inner diameter to 34 mm and the outer diameter to 57 mm.

Then the tube was heated in a resistance heated furnace under argon to 1900° C., whereby the free carbon and the free silicon react to form the $\beta$ silicon carbide without dimensional changes of the tube. The specific electrical resistance of this tube is about to 20 k$\Omega$cm$^{-1}$ with a $\beta$ silicon carbide proportion in the body of 65%.

In a subsequent doping step, this tube was treated at 1900° C. for 4 hours with $N_2$ at a pressure of p=1000 hPa. The specific electrical resistance then amounted to 50$\Omega$ cm$^{-1}$ with a nitrogen content of 0.08 weight percent.

The permeability to air at 20° C. and a pressure differential of 15 hPa amounted to 890 l/min; with reference to a filter surface of 1 cm$^2$, the specific air permeability was 130 l/min cm$^2$. (All subsequent data as to specific air permeability are given with reference to a pressure differential of 15 hPa in each case).

A further treatment with $N_2$ at 1900° C. over a period of 20 hours gave a specific electrical resistance of 18$\Omega$ cm$^{-1}$.

EXAMPLE 2

A tubular body fabricated under the same conditions and with the same starting material as in Example 1 is also coked as in Example 1. The doping with nitrogen is effected here, however, simultaneously with the conversion to $\beta$ silicon carbide. For that purpose the coked body is heated in a resistance heated furnace under $N_2$ to 1900° C.; the retention time at this temperature amounted to 4 hours.

The specific electrical resistance was 0.05$\Omega$ cm$^{-1}$ and the $N_2$ content was determined as 0.3 weight percent. The specific air permeability amounted to 130 l/min cm$^2$.

EXAMPLE 3

The raw materials were 168 g Novolak, 641 g $\alpha$ SiC and 191 g Si and were coated in accordance with Example 1, molded, coked and converted to $\beta$ SiC. The tubular body produced had a specific electrical resistance of 65 k$\Omega$cm$^{-1}$ and after doping with $N_2$ (4 hours at 1900° C.) of 108$\Omega$ cm$^{-1}$ with a $\beta$ silicon carbide proportion in the body of 30%. The specific air permeability was determined as 130 l/min cm$^2$.

EXAMPLE 4

The raw material described in Example 3 is processed in accordance with Example 2. The resulting specific electrical resistance of the tubular body then amounted only to 0.8$\Omega$ cm$^{-1}$ and the specific air permeability to 130 l/min cm$^2$.

EXAMPLE 5

461 g Novolak resin is dissolved in 2 l Ethanol and upon introduction of 538 g Si, a slurry is formed which is processed as in Example 1. From the recovered granulate, a tubular body is fabricated which is coked and then doped during the siliconizing at 1900° C. with nitrogen. The specific electrical resistance amounted to 0.3$\Omega$ cm$^{-1}$ and the specific air permeability was 130 l/min cm$^2$.

EXAMPLE 6

In a binder resin of 200 g Novolak and 1.5 liters Ethanol, 630 g Si and 169 g electrographite are supplied and the last formation carried out as described. The powder was granulated and further processed as described in Example 5.

The specific electrical resistance of the siliconized doped tube amounted to $0.03\Omega$ cm$^{-1}$. The specific air permeability was determined as 130 l/min cm$^2$.

EXAMPLE 7

According to Example 1, 289 g α-SiC, 34 g electrographite and 402 g Si is coated with 275 g Novolak resin. The coated powder is dried and, contrary to Example 1, is not agglomerated but is further processed in powder form. A portion of this powder is, for this purpose, extruded to form a tube with an outer diameter of 12 mm, an inner diameter of 8 mm and a length of 150 mm. This tube is coked and during the siliconizing is doped at 1900° C. with nitrogen. The specific electrical resistance amounted to $0.03\Omega$ cm$^{-1}$. The specific air permeability of this tube, by comparison with the denser materials of the earlier samples, amounted to 20 l/min cm$^2$.

In the FIG. an example of a diesel soot filter element has been shown in longitudinal section. According to this illustration, the tubular body has a total length of 340 mm with an internal diameter of 38 mm. On both ends of the body is a region each of a length of 55 mm for application of the electrical contacts. In this region the wall thickness of the body amounts to 8 mm and is thickened by contrast with the remaining wall with a wall thickness of 8 mm and 10 mm.

We claim:

1. A process for producing a porous, fluid-permeable body heatable by passage of an electric current through the body, said process comprising the steps of:
   (a) coating silicon-containing particles with a cokable organic binder to produce coated particles with a particle size fraction of 0.2 to 10 mm;
   (b) forming said particles into a molding having a shape of the body;
   (c) heating said molding at a temperature of 600° to 1000° C. to coke said binder and produce in a resulting coked molding reactable silicon and carbon sufficient to form β-silicon carbide in an amount of 30% to 100% of said body; and
   (d) thereafter heating said molding to a temperature of 1400° to 2000° C. in the presence of nitrogen derived from at least one of a nitrogen compound present in said body and a nitrogen atmosphere to react the silicon with the carbon and comprise said body of 30% to 100% of β silicon carbide simultaneously doped with nitrogen, thereby forming said body with a specific electrical resistance of $10^{-2}$ to $<18\Omega$ cm$^{-1}$ and a porosity of 35% to 75%.

2. The process defined in claim 1 wherein said coated particles are produced by forming a slurry of said silicon-containing particles in a liquid in which said binder is at least partly dissolved, and feeding the resulting slurry into a liquid in which said binder is less soluble to precipitate binder-coated particles, and freeing said binder-coated particles from the liquid and drying the binder-coated particles freed from the liquid.

3. The process defined in claim 2 wherein the slurry is injected through a mixing nozzle into said other liquid.

4. The process defined in claim 3 wherein the proportion of the binder in the slurry is greater than 10% by weight of the dry solids.

5. The process defined in claim 1 wherein said particles have a particle size range of 0.2 to 10 mm.

6. A process for producing a diesel soot filter element which comprises the steps of:
   (a) coating silicon-containing particles with a cokable organic binder to produce coated particles with a particle size fraction of 0.2 to 10 mm;
   (b) forming said particles into a molding having a tubular shape and having thickened walls at opposite ends of said body;
   (c) heating said molding at a temperature of 600° C. to 1000° C. to coke said binder and produce in a resulting coked molding reactable silicon and carbon sufficient to form β-silicon carbide in an amount of 30% to 100% of said body;
   (d) thereafter heating said molding to a temperature of 1400° C. to 2000° C. in the presence of nitrogen derived from at least one of a nitrogen compound present in said body and a nitrogen atmosphere surrounding said body to react the silicon with the carbon and comprise said body of 30% to 100% of β-silicon carbide simultaneously doped with nitrogen, thereby forming said body with a specific electrical resistance of $100^{-2}$ to less than 18 ohm cm$^{-1}$ and a porosity of 35% to 75% comprising the diesel soot filter element having electrical contacts at said opposite ends for passing an electric current through the diesel soot filter.

7. A diesel soot filter consisting of a body of silicon carbide containing 30% to 100% β-silicon carbide formed in situ and doped in situ with nitrogen and having a porosity of 35 to 75% and a specific electrical resistance of $100^{-2}$ to less than 18 ohm cm$^{-1}$.

* * * * *